United States Patent [19]
Woods et al.

[11] Patent Number: 5,747,733
[45] Date of Patent: May 5, 1998

[54] WIRING DUCT ENTRANCE FITTING ENCLOSURE

[76] Inventors: Randall T. Woods, 343 Sundance Dr., Bartlett, Ill. 60103; Robert Nicoli, 906 Strieff La., Glenwood, Ill. 60425

[21] Appl. No.: 810,719

[22] Filed: Mar. 3, 1997

[51] Int. Cl.⁶ .................................................. H02G 3/04
[52] U.S. Cl. .................................................. 174/48
[58] Field of Search ............... 174/50, 48; 220/3.92, 220/3.94, 4.02; 52/220.5, 220.7

[56] References Cited

U.S. PATENT DOCUMENTS

| | | | |
|---|---|---|---|
| 1,481,415 | 1/1924 | Casper | 220/4.02 |
| 2,736,451 | 2/1956 | Fogg | 220/3.8 |
| 2,881,940 | 4/1959 | Hamilton | 220/3.94 |
| 2,924,639 | 2/1960 | Zelt | 174/50 X |
| 3,083,856 | 4/1963 | Appleton | 220/3.2 |
| 3,215,769 | 11/1965 | Slater | 174/53 |
| 3,239,093 | 3/1966 | Gath | 220/4.02 |
| 3,571,771 | 3/1971 | Stephanson | 174/50 X |
| 4,541,538 | 9/1985 | Swetnam | 220/3.8 |
| 4,797,507 | 1/1989 | Löfving | 174/48 |
| 4,896,784 | 1/1990 | Heath | 220/3.94 X |
| 5,194,693 | 3/1993 | Brzozowski et al. | 174/50 |
| 5,274,194 | 12/1993 | Belcher | 174/50 |
| 5,300,731 | 4/1994 | DeBaratolo, Jr. et al. | 174/48 |
| 5,383,098 | 1/1995 | Ma et al. | 220/4.02 X |
| 5,398,833 | 3/1995 | Klauss et al. | 220/4.02 |
| 5,435,453 | 7/1995 | Higuchi | 220/3.94 X |

Primary Examiner—Kristine L. Kincaid
Assistant Examiner—Dean A. Reichard
Attorney, Agent, or Firm—Mark D. Hilliard; Robert A. McCann; Michael J. Turgeon

[57] ABSTRACT

A wire raceway fitting enclosure assembly including a base which has at least one side projection, and a cover which has at least one side rib depending from the top wall to retain a portion of the side projection in an interference fitting manner.

13 Claims, 4 Drawing Sheets

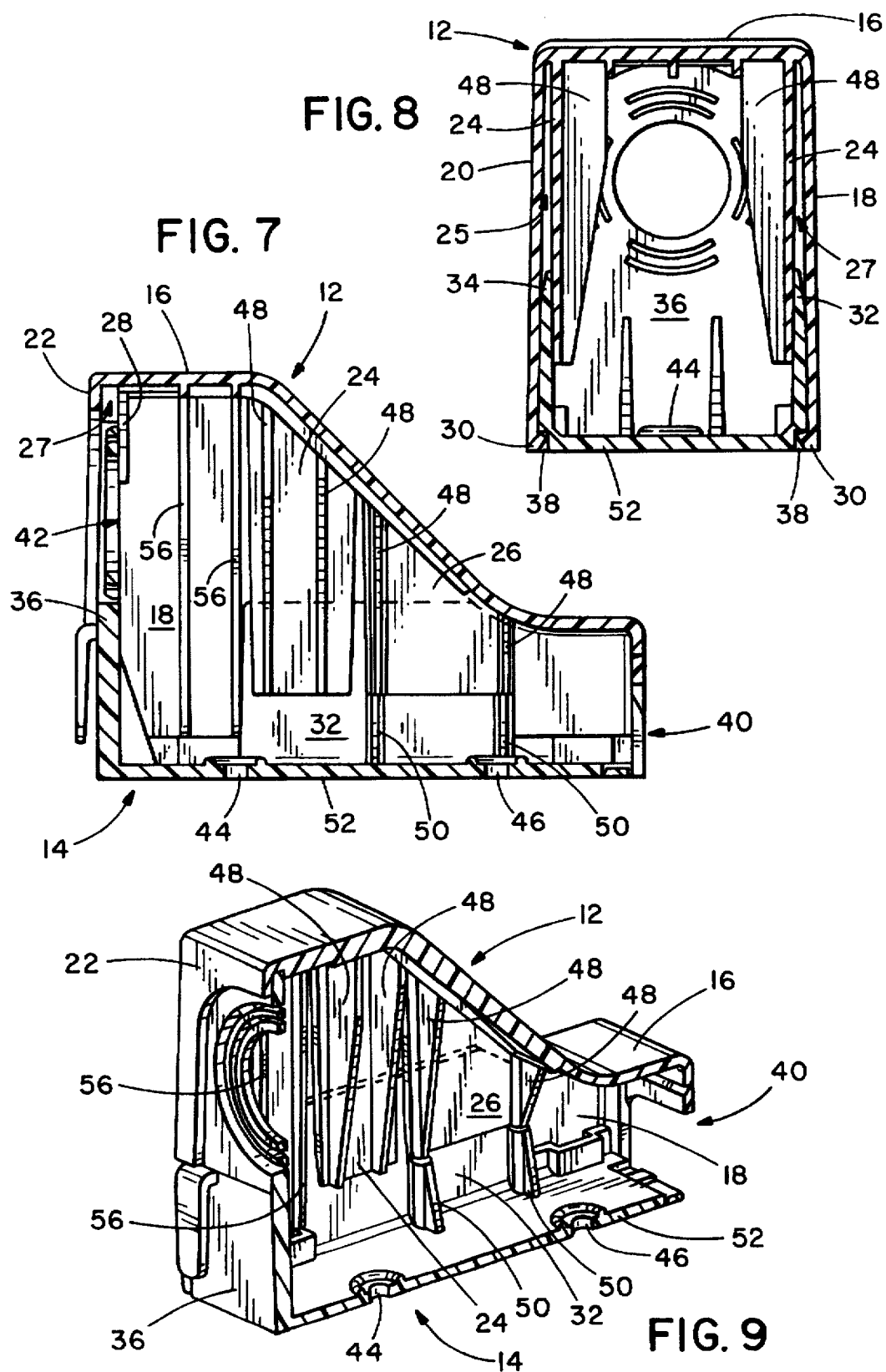

WIRING DUCT ENTRANCE FITTING ENCLOSURE

TECHNICAL FIELD

The present invention relates generally to wiring duct raceways used for communications systems, computer networks and electrical power systems where electrical power, fiber optic or other power and signal conductors are positioned in the wiring duct raceways for their protection and to provide an accessible, orderly and aesthetically pleasing installation. Specifically, the present invention relates to an entrance fitting assembly which resists disengagement and separation during and after a vertical impact load has been applied and introduces a conduit, electrical conductors or the like into a surface mounted duct system.

BACKGROUND OF THE INVENTION

The use of plastic wiring duct raceways to route electrical power, fiber optic and other power and signal conductors has become very popular. A typical duct system includes a plurality of raceway runs. The precise configuration of each duct system, including the raceway sizes, lengths and locations, and the number and type of junction enclosures, is determined by site specific wiring layout. These various types of ducting must provide an accessible, organized, orderly and aesthetically pleasing installation since the entire duct system is typically mounted on an exposed surface. Furthermore, because the duct is mounted on an exposed surface, it often experiences impact loads which disengage the cover from the base, or crack the cover.

Industry-wide testing and standards organizations, such as Underwriter Laboratories, establish requirements and specifications to which raceways must conform in order to be recognized by the organization. A cold impact test was recently adopted for nonmetallic surface raceways and fittings. The compliance date for recognition is the end of the first quarter of 1997. The UL5A Cold-Impact Test states that the raceway cover and base are to be cooled to approximately 32.0° F. (0.0° C.) and maintained there for three hours. Then within fifteen seconds after removal from the cold chamber the chilled assemblies are placed on a concrete floor and subjected to an impact of 5 ft-lbf (7J or 0.691 m-kgf) directed vertically downward. The impact is to be delivered by a smooth, solid steel sphere 2 inches (50.3 mm) in diameter, weighing 1.18 lb (535 g) and falling through a distance of 51 inches (1295 mm). Following the impact, a probe is applied to cracks and openings. The nonmetallic raceway part is not acceptable if the probe can be inserted more than 0.125 inches (3 mm) into any crack or other opening.

The prior art does not conform to these modern testing requirements. Manufacturers have attempted to achieve compliance by reinforcing existing designs. With this approach, the webs which reinforce the underside of the raceway cover and the cover and base have greatly thickened cross-sections, thus the cover resists any deformation at all. In practice, this approach is misdirected, in that, the covers become impossibly stiff, rigid, and consequently very difficult to install and access.

Accessability to the wiring duct raceway is very important since a layout design is always subject to change and the addition or subtraction of conductors happens with ever increasing frequency. Thus, the prior art designs fail to provide a wiring duct raceway fitting enclosure which will meet or exceed the industry testing requirements, resist disengagement and provide easy accessibility and manipulation of the cover.

Therefore, an impact-resistant raceway enclosure design which does not deform or disengage while exceeding industry testing requirements, interfaces with existing ducting, and provides accessability, organization and an aesthetically pleasing installation without an increase in cost is desired and improvement in the art of wiring duct raceway fittings is needed.

SUMMARY OF THE INVENTION

It is therefore an object of this invention to provide an improved wiring duct entrance fitting enclosure.

It is another object of this invention to provide a wiring duct entrance fitting enclosure assembly which meets and exceeds the requirements of the UL5A Cold Impact Test.

It is a further object of this invention to provide a wiring duct entrance fitting enclosure assembly which maintains its flexibility so that assembly or disassembly may be accomplished with considerable ease.

It is a still further object of the present invention to provide a wiring duct entrance fitting enclosure assembly which will not deform or become disassembled after a vertical impact load has been applied.

In general, a wiring duct entrance fitting enclosure assembly according to the present invention includes a base having projections extending from an end and the sides, a cover with ribs depending from a top wall which retains the end and side projections of the base in an interference fitting manner whereby the assembly resists disengagement from an impact load.

BRIEF DESCRIPTION OF THE DRAWINGS

FIG. 7 is a side sectional view taken along lines 7—7 of FIG. 1.

FIG. 8 is an end sectional view taken along lines 8—8 of FIG. 1.

FIG. 9 is a perspective view of FIG. 7.

DESCRIPTION OF THE PREFERRED EMBODIMENT

Figure 1:
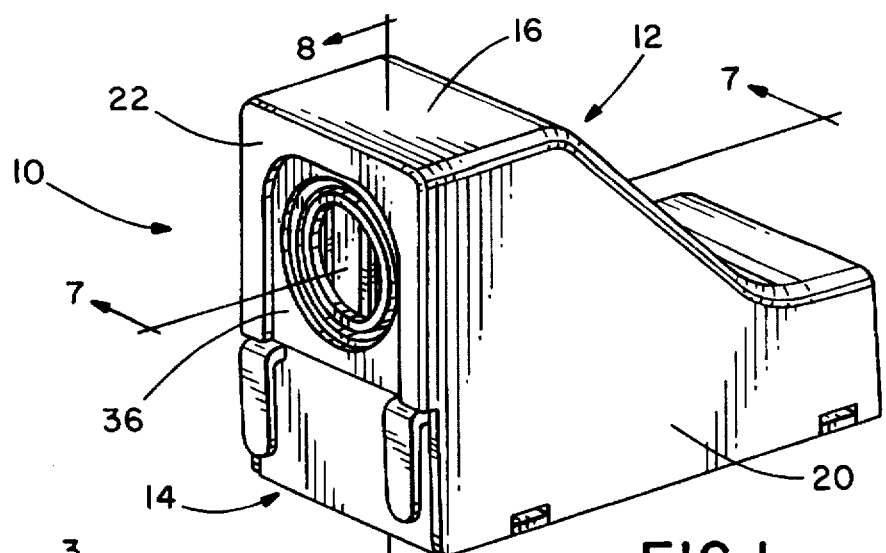
FIG. 1 is a perspective view of the wiring duct entrance fit enclosure assembly of the present invention.
Figure 2:
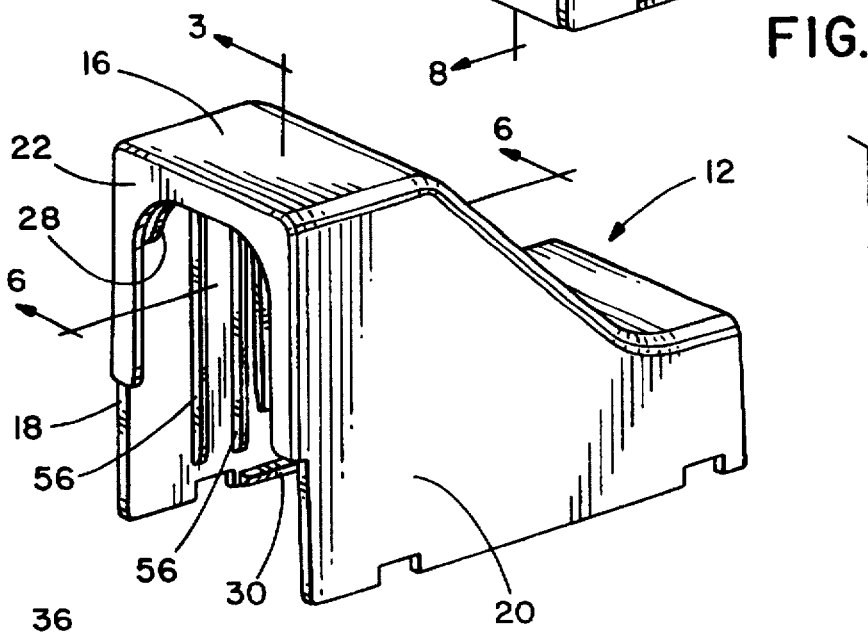
FIG. 2 is an exploded view of the wiring duct entrance fitting enclosure assembly prior to the cover being releasably coupled to the base.
Figure 2:
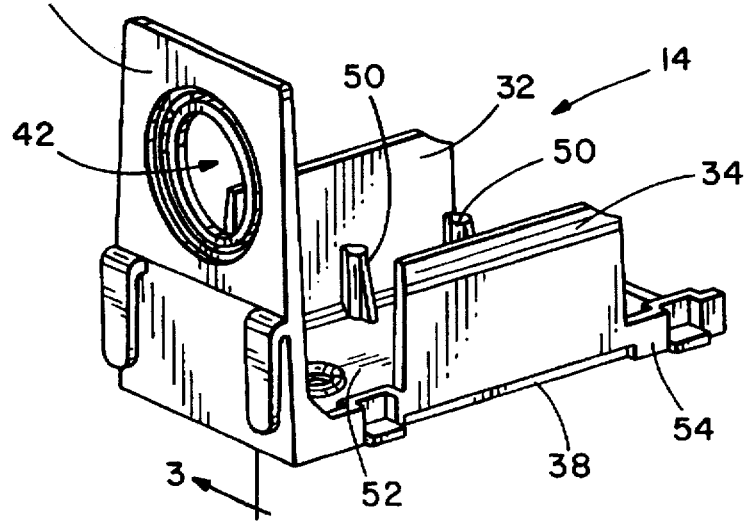

A wiring duct entrance fitting enclosure embodying the concept of the present invention is designated generally by the reference numeral 10 in the accompanying drawings. As shown in FIGS. 1–9, the enclosure 10 is used primarily as a wiring duct entrance fitting which is preferably made of plastic material via molding. The enclosure 10 comprises a base 14 which is mounted to a desired planar surface and a cover 12 which is releasably coupled to the base 14, as described in detail below, in a snap-locking fashion to form an impact resistant, nondisengagable UL-recognized duct fitting.

Figure 3:
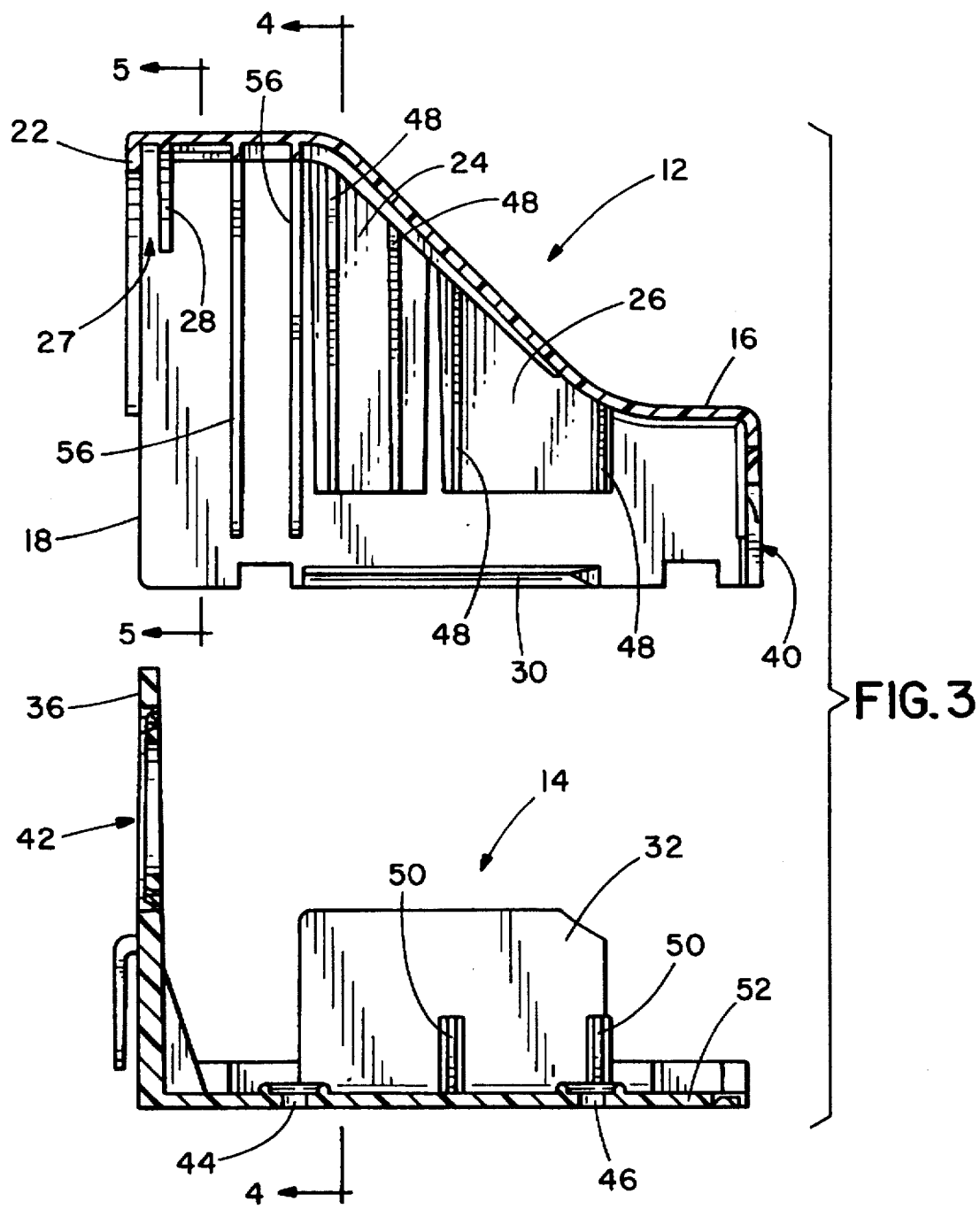
FIG. 3 is an exploded side sectional view taken along lines 3—3 of FIG. 2.
Figure 6:
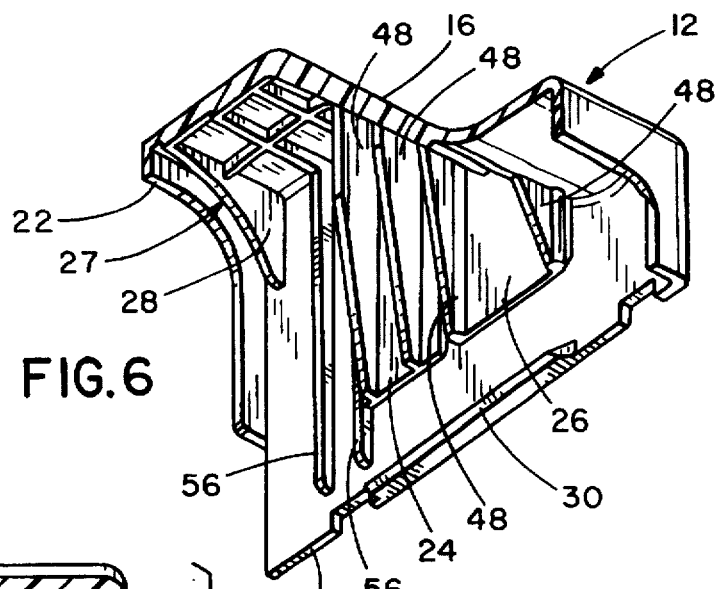
FIG. 6 is a cover side sectional view taken along lines 6—6 of FIG. 2.
Figure 4:
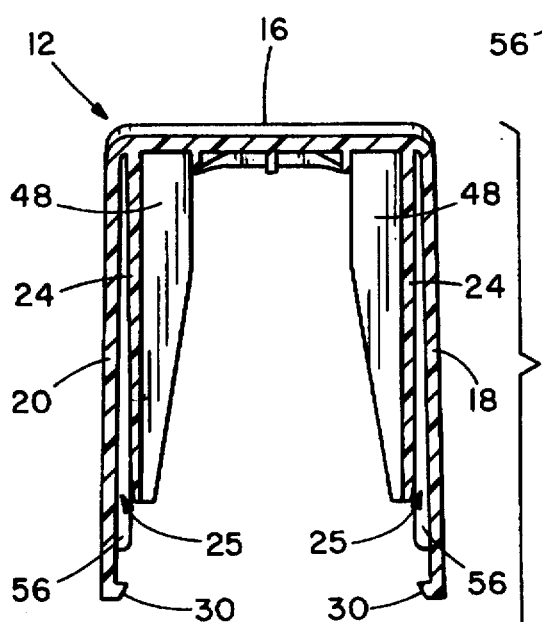
FIG. 4 is an exploded end sectional view taken along lines 4—4 of FIG. 3.
Figure 5:
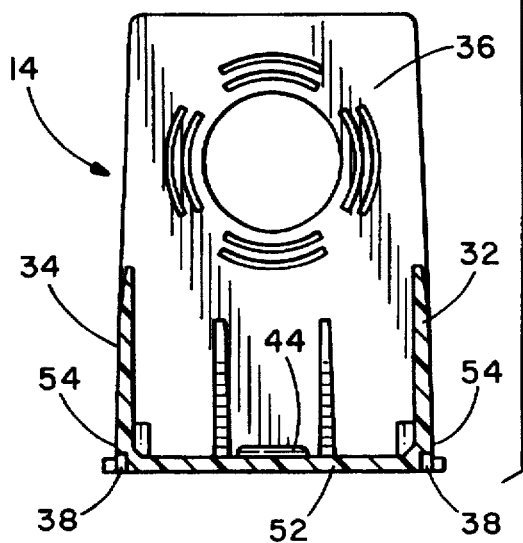
FIG. 5 is a cover end sectional view taken along lines 5—5 of FIG. 4.
Figure 5:
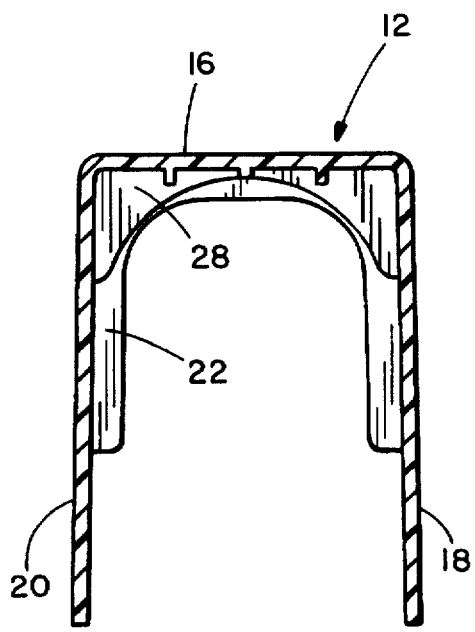

As best seen in FIGS. 2–4, 7 and 9, the base 14 has a mounting plate 52 which is a flat, planar member to which some of the operative elements of this invention are attached. The mounting plate 52 is attached to the desired surface via conventional fasteners engaging the mounting apertures 44 and 46. Perpendicular to the mounting plate 52 at one end of the base 14 is an end planar projection 36. As best seen in FIG. 3, the end planar projection 36 has cross-sectional thickness which increases from top to bottom. This helps create an interference fit with the cover 12, as will be described below. Preferably, a size-selectable conduit mounting aperture 42 extends through the end planar projection 36 to provide a port for introducing conventional round conduit which may carry communication cables such as optical fibers, electrical power or signal or other conductors.

Disposed on a portion of the side edges 54 of the mounting plate 52 are side planar projections 32 and 34. The side planar projections 32 and 34 are shown as preferably rectangular extensions rising from the base. As can be best seen in FIGS. 2 and 4, these side planar projections 32 and 34 have a substantially constant cross-section. However, at the top, the side planar projections 32 and 34 decrease in cross-section to ease the engagement of the cover 12 with the base 14.

Lower reinforcing flanges 50 add strength at the intersection of the side planar projections 32 and 34 and the mounting plate 52, yet allow the side planar projections 32 and 34 to remain flexible to a degree. Additionally, the lower reinforcing flanges 50 are disposed in such a manner as to transfer an impact load from the cover 12 to the base 14 and in turn to the desired mounting surface, as described in detail below. This manner of design allows for a thinner and more consistent cross-sectional thickness of the base, cover, projections and ribs, thereby permitting flexibility and accessibility to remain high while still providing increased strength and impact resistance.

As best seen in FIGS. 2–6, the cover 12 has a top wall 16, two side walls 18 and 20, and at least one end wall 22. Disposed inside the side walls 18 and 20, and the end wall 22 are ribs 24, 26 and 28 which depend from the top wall 16 to retain the side planar projections 32 and 34 and the end planar projection 36 in an interference fitting manner. An interference fit is generated with the side planar projections 32 and 34 and the side projection receiving area 25 as a result of two factors. First, as mentioned above, the side planar projections 32 and 34 have a nearly constant cross-section. Second, the side projection receiving areas 25, the area between the cover side walls 18 or 20 and side ribs 24 and 26, has a cross-sectional area which decreases from the bottom to the top. Thus, when the cover 12 engages the base 14, the side planar projections 32 and 34 are forced into the side projection receiving area 25 and an interference fit is generated. Likewise, with regard to the end planar projection 36 and the end projection receiving area 27, the end planar projection 36 has an increasing cross-section, as described above, and the end projection receiving area 27 has a constant cross-sectional area. Thus, another interference fit is created. These interference fits restrict the side wall 18 or 20 or end planar projection 36 from bowing out or buckling under an impact load.

As best seen in FIGS. 3, 6, 7 and 9, the side ribs 24 and 26 are two independent, separate sections, each of which is disposed proximate to the side wall 18 or 20. Furthermore, the side ribs 24 and 26 have upper reinforcing flanges 48 which help transfer the load of an impact to the base 14 via appropriately positioned lower reinforcing flanges 50. The upper reinforcing flanges 48 also reduce or resist any deflection of the side ribs 24 and 26. Thereby, the established interference fit remains and consequently does not permit disengagement of the cover 12 from the base 14.

As best seen in FIGS. 2, 3, 6 and 7, side wall reinforcing ridges 56, lend further support against the cover side wall 18 or 20 flexing or bowing out to encourage disengagement. Further, these ridges 56 additionally transfer any impact load to the base 14 and in turn the desired mounting surface. Thereby, permitting flexibility yet generating great impact resistance.

The end rib 28, much like the side ribs 24 and 26, is disposed relatively close to the end wall 22 to provide the desired degree of an interference fit, as described above. This arrangement, preferably, does not permit the end planar projection 36 to deform or deflect upon impact, thereby enabling the cover 12 and base 14 combination to remain intact.

As best seen in FIG. 8, coupling of the cover 12 and base 14 is positively enacted by latches 30 which are preferably formed on a portion of the lower edge of the side wall 18 and 20 of the cover 12. Any latching means can be used such as, engaging arrowhead and slot, opposed arrowheads, projection and slot, opposing projections, manipulable lever with linkage which engages a projection and the like. Preferably, the latches 30 project interiorly from the cover 12 and are positively retained in the latch receiving area 38 of the base 14. Thus, vertical movement of the cover 12 is eliminated.

In operation, the base 14 is mounted to a planar surface via conventional fasteners cooperating with the mounting apertures 44 and 46. Conventional round conduit may then be attached to the base to provide access for the selected conductors. A conventional two-piece wiring duct raceway, which are well known and thus will not be discussed in detail, can then be fitted to the base 14 such that it will be received by the raceway aperture 40 of the cover 12. After the conductors have been routed and connections made, the cover 12 is aligned over the base 14 for attachment. The end planar projection 36 and the side planar projections 32 and 34 are aligned to be received by the end projection receiving area 27 and the side projection receiving area 25, respectively. The cover 12 is then pushed downward whereby the latches 30 snap-lock into the latch receiving areas 38 and the cover 12 is positively secured into position.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A wiring duct raceway entrance fitting comprising:
   a base member having at least one side projection extending from some portion of a longitudinal side of the base member; and
   a cover having a top wall, at least one side wall depending from a longitudinal edge of the top wall, and at least one side rib depending from the top wall and disposed interiorly of the at least one side wall such that a substantial portion of the at least one side projection is retained within a side receiving area defined between the at least one side wall and the at least one side rib, wherein planar surface contact is generated between the at least one side wall and the at least one side projection, and between the at least one side rib and the at least one projection.

2. An entrance fitting of claim 1 wherein, an interference fit is generated when the at least one side projection is disposed within the side receiving area as a result of an interface of the at least one side projection's cross-section, which decreases from a base thereof to a furthest extension thereof, and the side receiving area's cross-section, which decreases from a furthest depending portion thereof to the top wall.

3. An entrance fitting of claim 1 wherein, means for latching is disposed on a substantial length of a distal, bottom longitudinal edge of the side wall of the cover which operatively associates with a latch receiving area formed on a substantial portion of the longitudinal side of the base member and disposed below a longitudinal extent of the at least one side projection.

4. An entrance fitting of claim 1 wherein, the base member further comprises an end projection extending from an end of the base member.

5. An entrance fitting of claim 4 wherein, the cover further comprises an end wall depending from an end of the top wall, and an end rib which depends from the top wall and is disposed interiorly of the end wall, such that the end projection is retained within an end receiving area defined between the end wall and the end rib, wherein planar surface contact is generated between the end wall and the end projection, and between the end projection and the end rib.

6. An entrance fitting of claim 5 wherein, an interference fit is generated when the end projection is positioned within the end receiving area as a result of an interface of the end projection cross-section, which decreases from a base thereof to a furthest extension thereof, and the end receiving area's cross-section, which decreases from a furthest depending portion thereof to the top wall.

7. A wiring duct raceway entrance fitting comprising:

a base member having
  at least one side projection extending from a substantial portion of a longitudinal side of the base member; and
  an end projection extending from an end of the base member;
  wherein the end projection forms an exterior surface of the entrance fitting; and a cover having
  a top wall;
  at least one side wall depending from a longitudinal edge of the top wall which forms another exterior surface of the entrance fitting; and
  at least one side rib which depends from the top wall and is disposed interiorly of the side at least one wall wherein a substantial portion of the at least one side projection is firmly grasped and frictionally retained within a side receiving area defined between the at least one side wall and the at least one side rib.

8. An entrance fitting of claim 7 wherein, means for latching is disposed on a substantial length of a distal, bottom longitudinal edge of the side wall of the cover which operatively associates with a latch receiving area formed on a substantial portion of the longitudinal side of the base member and disposed below a longitudinal extent of the at least one side projection.

9. A wiring duct raceway entrance fitting comprising:

a base member having
  at least one side projection extending from a substantial portion of a longitudinal side of the base member; and
  an end projection extending from an end of the base member,
  wherein the end projection further has an aperture therethrough which is adapted to facilitate attachment of other raceways thereto; and a cover having
  a top wall;
  side walls depending from longitudinal edges of the top wall;
  at least one side rib depending from the top wall and disposed interiorly of a corresponding one of the side walls;
  an end wall depending from an end of the top wall; and
  an end rib depending from the top wall and disposed interiorly of the end wall, wherein the end wall and the end rib each depend below a lowest point of the aperture, which is a substantial distance less than a distance the at least one side wall depends, and the end wall and the end rib each are contoured to facilitate attachment of other raceways thereto without interference therefrom.

10. An entrance fitting of claim 9 wherein, means for latching is disposed on a substantial length of a distal, bottom longitudinal edge of the side wall of the cover which operatively associates with a latch receiving area formed on a substantial portion of the longitudinal side of the base member and disposed below a longitudinal extent of the at least one side projection.

11. A wiring duct raceway entrance fitting comprising:

a base member having
  at least one side projection extending from a substantial portion of a longitudinal side of the base member; and
  lower reinforcing flanges attached to the base member and the at least one side projection to increase the stiffness thereof, which extend a certain distance from the base member less than the at least one side projection;

a cover having
  a top wall;
  sidewalls depending from longitudinal edges of the top wall;
  at least one side rib depending from the top wall and disposed interiorly of one of the sidewalls; and
  upper reinforcing flanges attached to the top wall and the at least one side rib to increase the stiffness thereof, wherein the at least one side rib and the upper reinforcing flanges depend a certain distance from the top wall such that each contacts the lower reinforcing flanges when the cover is completely installed and the upper reinforcing flanges align with the lower reinforcing flanges in order to transfer vertical impact loads from the cover to the base member and to any surface on which the entrance fitting is adapted to be attached, thereby eliminating disengagement of the cover from the base member.

12. An entrance fitting of claim 11 wherein, means for latching is disposed on a substantial length of a distal, bottom longitudinal edge of the side wall of the cover which operatively associates with a latch receiving area formed on a substantial portion of the longitudinal side of the base member and disposed below a longitudinal extent of the at least one side projection.

13. A wiring duct raceway entrance fitting comprising:
a planar base member having
  a pair of planar side projections, each extending from a substantial portion of a longitudinal side of the base member, each having a cross-sectional thickness which decreases as it extends from the base member;
  lower reinforcing flanges disposed interiorly of the side projection at spaced positions along a longitudinal extent of the base member from which the side projections extend, the lower reinforcing flanges integrally formed to the side projections and the base member to decrease the flexibility of the side projections and transfer impact loads to the base member;
  a planar end projection extending from an end of the base to a height greater than a height of the side projections, and having an aperture therethrough; and
  latch receiving areas formed on a substantial portion of the longitudinal side of the base member and disposed on the base member below a longitudinal extent of the side projections; and
a cover having
  an elevation contoured top wall;
  a pair of side walls, each depending from a longitudinal edge of the top wall;
  a pair of side ribs each of which depends from the top wall and is disposed interiorly of a respective one of the side walls such that a substantial portion of each side projection is retained within a side receiving area defined between each side wall and each side rib in an interference fitting manner;
  the side receiving area having a cross-sectional width dimension which is greatest at a point furthest from the top wall and least nearest the top wall;
  upper reinforcing flanges disposed interiorly of the side ribs at spaced positions along a longitudinal extent of each side rib, which depend from the top wall and are connected to one of the side ribs to reduce deflection thereof and transfer a vertical impact load to the lower reinforcing flanges;
  an end wall depending from a lateral, end edge of the top wall; an end rib which depends from the top wall and is disposed interiorly of the end wall such that an uppermost extent of the end projection is retained within an end receiving area, defined between the end wall and the end rib, in an interference fitting manner;
  and a latch disposed on a substantial length of a distal, bottom longitudinal edge of each of the side walls of the cover which operatively associates with the latch receiving area;
whereby the fitting maintains flexibility for installation and removal yet gains strength against deforming vertical impact loads and resists disengagement.

\* \* \* \* \*